(12) United States Patent
Terakubo et al.

(10) Patent No.: US 8,519,586 B2
(45) Date of Patent: Aug. 27, 2013

(54) MOLDED MOTOR

(75) Inventors: Hidetaka Terakubo, Kawasaki (JP);
Toshihiko Yamada, Kawasaki (JP);
Takaoki Mori, Kawasaki (JP)

(73) Assignee: Fujitsu General Limited, Kawasaki-Shi (JP)

( * ) Notice: Subject to any disclaimer, the term of this patent is extended or adjusted under 35 U.S.C. 154(b) by 252 days.

(21) Appl. No.: 12/923,294

(22) Filed: Sep. 14, 2010

(65) Prior Publication Data

US 2011/0068646 A1   Mar. 24, 2011

(30) Foreign Application Priority Data

Sep. 18, 2009  (JP) .................. 2009-217713

(51) Int. Cl.
*H02K 11/00* (2006.01)
(52) U.S. Cl.
USPC .................. 310/91; 310/43; 310/89
(58) Field of Classification Search
USPC ........................................ 310/43, 71, 89–91
See application file for complete search history.

(56) References Cited

U.S. PATENT DOCUMENTS

| 4,515,417 | A | * | 5/1985 | Shiraishi ........................ 384/445 |
| 6,577,031 | B2 | * | 6/2003 | Morooka et al. ............ 310/68 R |
| 7,365,458 | B2 | * | 4/2008 | Yoshida ....................... 310/68 R |
| 7,456,533 | B2 | * | 11/2008 | Nanbu et al. ..................... 310/71 |
| 2005/0253480 | A1 | * | 11/2005 | Pizzichil ........................ 310/261 |
| 2005/0285464 | A1 | * | 12/2005 | Orders et al. ..................... 310/88 |
| 2006/0220474 | A1 | * | 10/2006 | Yoshida .......................... 310/43 |
| 2007/0205679 | A1 | * | 9/2007 | Terauchi et al. ................ 310/71 |
| 2008/0042499 | A1 | * | 2/2008 | Okada ............................. 310/43 |
| 2011/0234024 | A1 |   | 9/2011 | Hasegawa et al. |

FOREIGN PATENT DOCUMENTS

WO   WO2010/067615 A   6/2010

* cited by examiner

*Primary Examiner* — Tran Nguyen
*Assistant Examiner* — Naishadh Desai
(74) *Attorney, Agent, or Firm* — Manabu Kanesaka

(57) ABSTRACT

To prevent electrolytic corrosion from occurring by reliably establishing an electrical conduction between a motor output shaft and brackets. A first bracket 51 attached to one end part and a second bracket 52 attached to the other end part are electrically connected to each other via a conductive member 8 embedded in a molding resin part 21 of a stator 2.

13 Claims, 6 Drawing Sheets

\# MOLDED MOTOR

CROSS-REFERENCE TO RELATED APPLICATIONS

The present application is based on, and claims priority from, Japanese Application Serial Number JP2009-217713, filed Sep. 18, 2009, the disclosure of which is hereby incorporated by reference herein in its entirety.

TECHNICAL FIELD

The present invention relates to a molded motor in which the whole of a stator is molded integrally by using a molding resin. More particularly, it relates to a grounding structure of molded motor for preventing electrolytic corrosion.

BACKGROUND ART

For example, as described in Japanese Patent Application Publication No. 2007-20348, in an inverter-controlled brushless DC motor, a minute voltage is induced between the output shaft and the frame of the motor. If this voltage is higher than the voltage allowed against the insulation resistance of bearing grease, electric discharge takes place on the bearing rolling surface, so that the bearing may be damaged by the electric discharge machining effect. This phenomenon is called electrolytic corrosion.

The occurrence of electrolytic corrosion produces flaking, pitting, fluting (washboard-form pattern), and the like on the bearing rolling surface, and these defects cause an early bearing failure.

Accordingly, in Japanese Patent Application Publication No. 2007-20348, bearing brackets provided at the right and left of a stator are electrically connected to each other via a conductive tape to decrease the potential difference between the output shaft and the frame, thereby preventing electrolytic corrosion from occurring.

Unfortunately, the conventional method for preventing electrolytic corrosion has posed problems described below. In Japanese Patent Application Publication No. 2007-20348, the brackets are electrically connected to each other via the conductive tape, and the conductive tape peels off easily because of being a tape. Also, the productivity is degraded by the increase of the process for sticking the conductive tape.

Furthermore, since the conductive tape is uncovered on the motor surface, care must be taken not to bring other parts into contact with the conductive tape when the motor is incorporated into a product. Also, the conductive tape may be peeled off by transportation or shock.

SUMMARY OF THE INVENTION

The present invention has been made to solve the above-described problems, and accordingly an object thereof is to provide a molded motor in which an electrical conduction is established reliably between a pair of brackets, thereby preventing electrolytic corrosion from occurring.

To achieve the above object, the present invention provides a molded motor including a stator in which a stator core is integrally molded by a molding resin and is covered with a molding resin part; a rotor arranged on the inner peripheral surface side of the stator and an output shaft attached to the rotor; a pair of metallic brackets arranged on both the end surface sides in the axial direction of the stator; and a pair of bearings attached to the output shaft, each of the brackets being provided with a bearing supporting part for supporting the bearing, wherein the pair of brackets consist of a first bracket for holding one of the bearings and a second bracket for holding the other of the bearings; and in the molding resin part, there is embedded a conductive member that is electrically in non-contact with the stator core and is electrically connected to the first bracket and the second bracket.

According to this configuration, since the first bracket and the second bracket are electrically connected to each other via the conductive member embedded in the molding resin, an electrical conduction can be established reliably. Further, since the conductive member is embedded in the molding resin, the conductive member does not come off, for example, at the time of transportation. Also, electrolytic corrosion can be prevented.

As a preferred mode, on the outer peripheral surface of the stator core, a concave part extends along the axis line direction of the output shaft; and the conductive member is arranged along the concave part.

According to this configuration, since the conductive member is arranged along the concave part extending along the axis line direction on the outer peripheral surface of the stator core, the radial projection of the conductive member can be restrained. Also, the conductive member can be provided without an increase of the size of the whole motor.

Further, the conductive member consists of an L-shaped metal sheet arranged along the outer peripheral surface from one end surface in the axial direction of the stator core; and the first bracket is molded integrally by the molding resin in a state of being electrically connected to one end of the conductive member.

According to this configuration, since the conductive member is integrally molded by the molding resin in the state in which the one end of the conductive member consisting of the L-shaped metal sheet arranged along the outer peripheral surface from the one end surface of the stator is electrically connected to the first bracket, an electrical conduction between the first bracket and the conductive member can be established reliably. Further, by covering the contact point with the molding resin, a poor contact point and a short circuit can be prevented.

The other end of the conductive member is exposed from a part of the outer peripheral surface of the stator, and is fixed so that the second bracket is in contact with the exposed surface.

According to this configuration, since the other end of the conductive member is exposed from a part of the outer peripheral surface of the stator, and is fixed so that the second bracket is put on the exposed surface, the conductive member can be brought into contact with the second bracket by attaching the second bracket to the stator.

Also, the stator core is provided with an insulator; and on the other hand, the insulator is provided with a holding member for holding the conductive member.

According to this configuration, since the holding member for holding the conductive member is provided in a part of the insulator, when the insulator is attached to the stator core or when the insulator is molded integrally with the stator core, the holding member can be formed at the same time.

The holding member is provided on the outer peripheral surface of the stator core along the axis line direction of the output shaft; and the holding member is provided with a holding groove for holding the conductive member.

According to this configuration, since the holding member is formed along the axis line direction of the stator core, and the holding groove for holding the conductive member is further provided, insulating treatment for insulating the conductive member from the stator core can be performed reliably while the conductive member is held.

DETAILED DESCRIPTION

Figure 1:
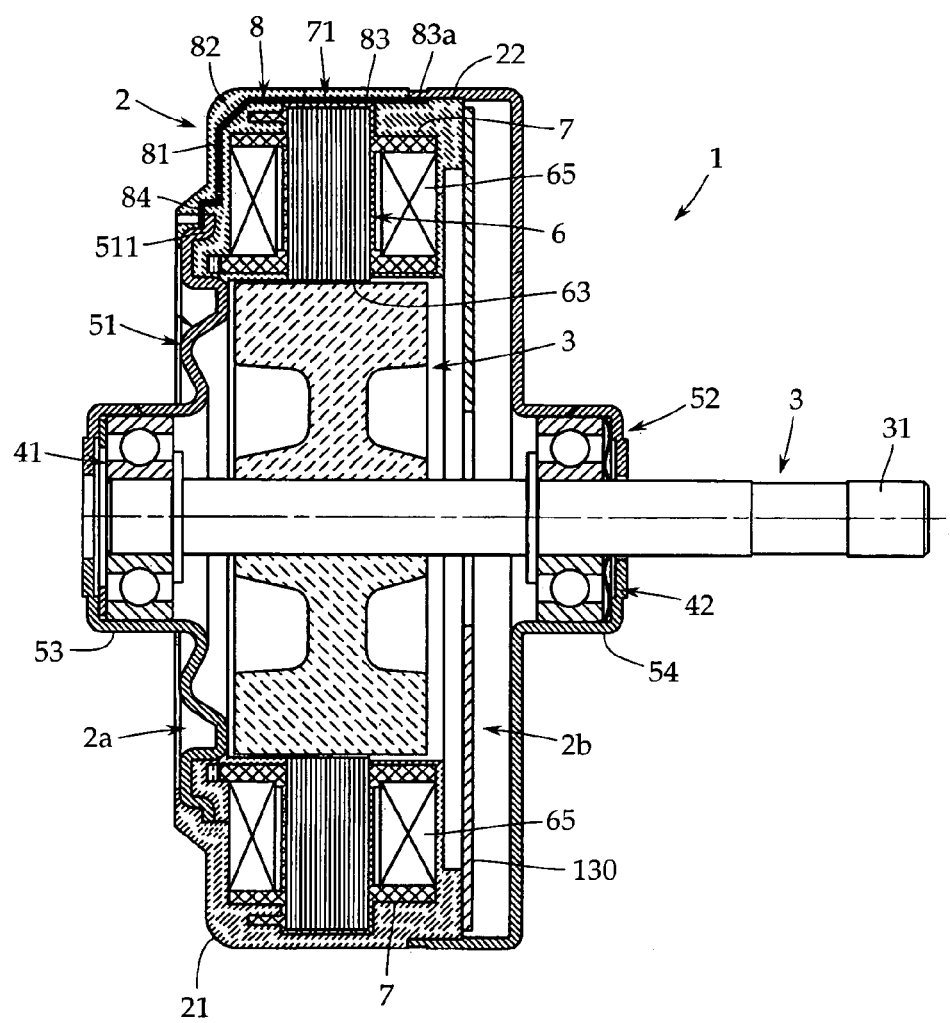
FIG. 1 is a central longitudinal sectional view of a molded motor in accordance with one embodiment of the present invention.

An embodiment of the present invention will now be described with reference to the accompanying drawings. The present invention is not limited to this embodiment. As shown in FIG. 1, an electric motor 1 includes a stator 2 and a rotor 3. The stator 2 is configured so that a stator core 6 configured by laminating magnetic steel sheets each blanked into a ring shape is molded integrally by a molding resin with the inner peripheral surface (a teeth surface 63) thereof being left, and is covered with a molding resin part 21. The rotor 3 is arranged on the inner periphery side of the stator 2 so as to face to the teeth surface 63 of the stator 2.

On both the end surface sides in the axial direction (on the left-hand surface side and the right-hand surface side in FIG. 1) of the stator 2, a pair of bearings 41 and 42 for rotatably supporting an output shaft 31 of the rotor 3 and a pair of brackets 51 and 52 for holding the bearings 41 and 42, respectively, are provided.

One bracket 51 (hereinafter, referred to as a first bracket 51) consists of a molded product obtained by pressing one metal sheet, and is formed into a disc shape so as to close one opening 2a of the stator 2. In the center of the first bracket 51, a first bearing holding part 53 for storing one bearing 41 (hereinafter, referred to as a first bearing 41) is provided.

The first bearing holding part 53 is a concave part depressed in the direction such that the central part of the first bracket 51 is separated from the stator 2, and the outer race of the first bearing 41 is fitted on the inner peripheral surface thereof.

The other bracket 52 (hereinafter, referred to as a second bracket 52) similarly consists of a molded product obtained by pressing one metal sheet, and is formed into a cup shape so as to cover the other opening 2b of the stator 2 and to be fitted along the outer peripheral surface of the stator 2.

In the center of the second bracket 52, a second bearing holding part 54 for storing the other bearing 42 (hereinafter, referred to as a second bearing 42) is provided. The second bearing holding part 54 is a concave part depressed in the direction such that the central part of the second bracket 52 is separated from the stator 2, and the outer race of the second bearing 42 is fitted on the inner peripheral surface thereof.

In this embodiment, as the rotor 3, a permanent magnet type rotor provided with a permanent magnet is used. However, any other rotor such as a squirrel-cage rotor or wound rotor having no permanent magnet may be used. The specific form of the rotor 3 may be optional in the present invention.

The stator 2 includes the ring-shaped stator core 6, insulators 7 for insulating the stator core 6, and a conductive member 8 for electrically connecting the brackets 51 and 52 to each other. The whole of the stator core 6 is integrally molded by the molding resin with the teeth surface 63 thereof being left and is covered with the molding resin part 21.

Figure 3:
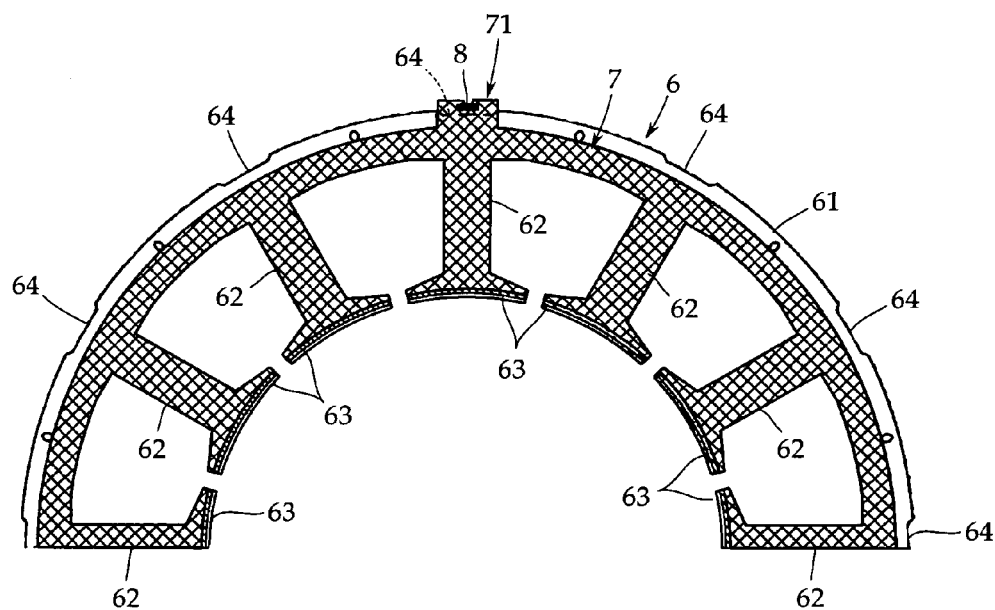
FIG. 3 is a partial sectional view of an insulator of the molded motor shown in FIG. 1.

Referring additionally to FIG. 3, the stator core 6 includes a yoke 61 formed into a ring-shape, and a plurality of teeth 62 provided so as to project from the inner peripheral surface of the yoke 61 toward the magnet pole surface of the rotor 3. The stator core 6 is configured so that the yoke 61 and the teeth 62 are formed by integrally laminating blanked magnetic steel sheets along the axis line direction (the direction perpendicular to the paper surface in FIG. 3).

In this example, each of the teeth 62 extends in a rod shape from the inner peripheral surface of the yoke 61 toward the center. The adjacent teeth 62 are arranged at an interval of about 30 degrees in the circumferential direction, and in this example, a total of 12 teeth (12 poles) are provided. However, the number of poles of the teeth 62 is optional in the present invention. At the tip end of each of the teeth 62, the arcuate teeth surface 63 facing to the magnetic pole surface of the rotor 3 is provided. On each of the teeth 62, a coil 65 is wound via the insulator 7, which is an insulating member.

The insulator 7 consists of a resin molded product, and covers the surface of the stator core 6 excluding the teeth surfaces 63 of the stator core 6. In this example, the insulator 7 is divided into two parts in the axis line direction from the central portion in the axial direction of the stator core 6, and is configured so as to cover the stator core 6 by being fitted to each other from both sides in the axial direction toward the stator core 6. The insulator 7 may be molded integrally with the stator core 6 by using a mold, and the specific shape, assembly, and the like of the insulator 7 may be optional in the present invention.

In a part of the insulator 7, a holding member 71 for holding the conductive member 8 is provided integrally. The holding member 71 may be provided as a separate member. Referring additionally to FIGS. 4 and 5, the holding member 71 takes a plate shape extending along the axis line direction from the outer peripheral surface of the insulator 7, and is provided along the outer peripheral surface of the stator core 6. Due to this provision of the holding member 71 on the outer peripheral surface of the stator core 6, the holding member 71 also plays a role as an insulating member for insulating the conductive member 8 from the stator core 6. The insulating member may be provided separately from the holding member 71.

The holding member 71 is provided along a concave part 64 extending along the axis line direction of the outer peripheral surface of the stator core 6. The concave part 64 is provided at a position opposed to each of the teeth 62 on the outer peripheral surface side of the stator core 6. The holding member 71 has only to be provided in at least one concave part 64.

According to this configuration, since the holding member 71 is provided in the concave part 64, the conductive member 8 can be arranged on the outer peripheral surface side of the stator core 6 without an increase of the diameter of the stator 2. Also, since the concave part 64 is provided at the position opposed to each of the teeth 62 in the radial direction, the concave part 64 can be provided without an increase of magnetic resistance while the magnetic path of the yoke 61 is secured. The concave part 64 of the stator core 6 can also be used for positioning the stator core 6 when the insulator 7 is provided on the stator core 6 or when the coil 65 is wound.

Figure 5A:
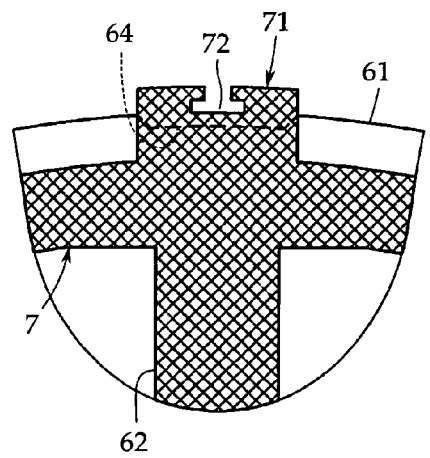
FIG. 5A is a partial enlarged sectional view of a holding member.
Figure 5B:
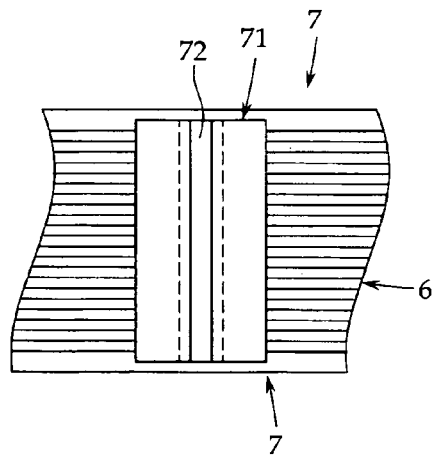
FIG. 5B is a front view of a holding member.

The holding member 71 is provided with a holding groove 72 for guiding the installation of the conductive member 8 and also for holding the conductive member 8. Referring additionally to FIGS. 5A and 5B, the holding groove 72 is formed along the extension direction in the center of the holding member 71, and is formed into a C shape in cross section so as to support the conductive member 8 by holding it therein.

According to this configuration, by inserting the conductive member 8 from one end side of the holding groove 72, the conductive member 8 can be installed along the holding groove 72. In this example, the holding groove 72 is provided continuously along the extension direction of the holding member 71. However, the holding groove 72 may be provided intermittently at predetermined intervals.

Also, the holding groove 72 is formed into a C shape in cross section, and insertingly holds the conductive member 8 therein. However, the holding groove 72 may be formed into a hook shape, i.e. an L shape, or an O shape. The shape of the holding groove 72 may be optional if the insulation from the stator core 6 can be secured while the conductive member 8 is held. Also, the holding groove 72 may be a simple deep groove if the conductive member 8 can be held while being insulated.

Figure 4A:
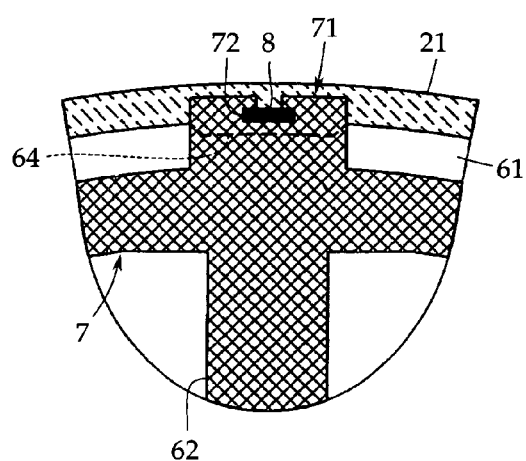
FIG. 4A is a partial enlarged sectional view showing a state in which a conductive member is attached to a holding member.
Figure 4B:
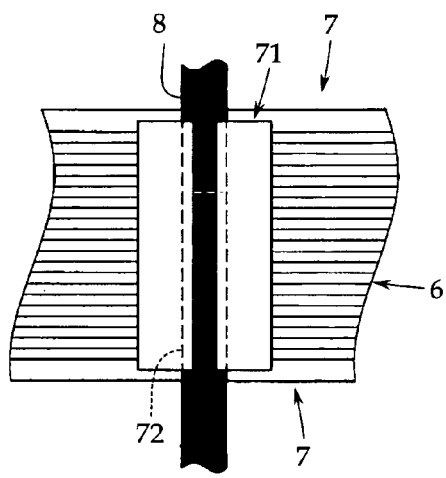
FIG. 4B is a front view showing a state in which a conductive member is attached to a holding member.
Figure 6:
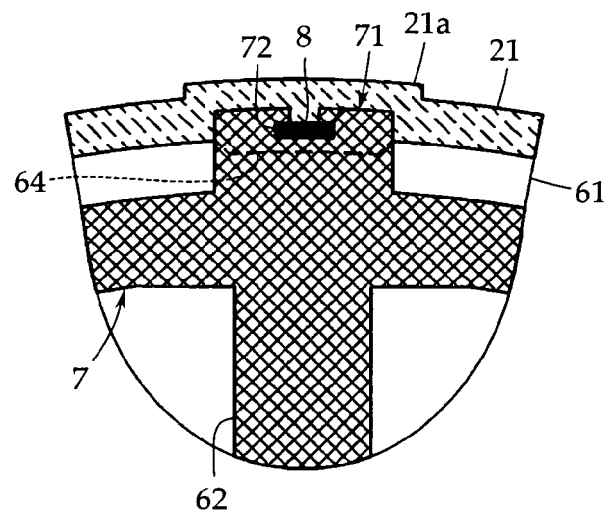
FIG. 6 is a partial enlarged sectional view showing a modification of a holding member.

In this example, as shown in FIG. 4A, the outer periphery of the holding member 71 is covered with the arcuate molding resin part 21. However, as shown in FIG. 6, a part 21a of the molding resin part 21 may be formed so as to project to the outside. By projecting the part 21a of the molding resin part 21 to the outer periphery in this manner, the thickness in the radial direction of the molding resin part 21 can be kept, so that the strength of the molding resin part 21 increases. The projection part 21a can also be used for positioning when the motor is incorporated into a product.

Figure 2:
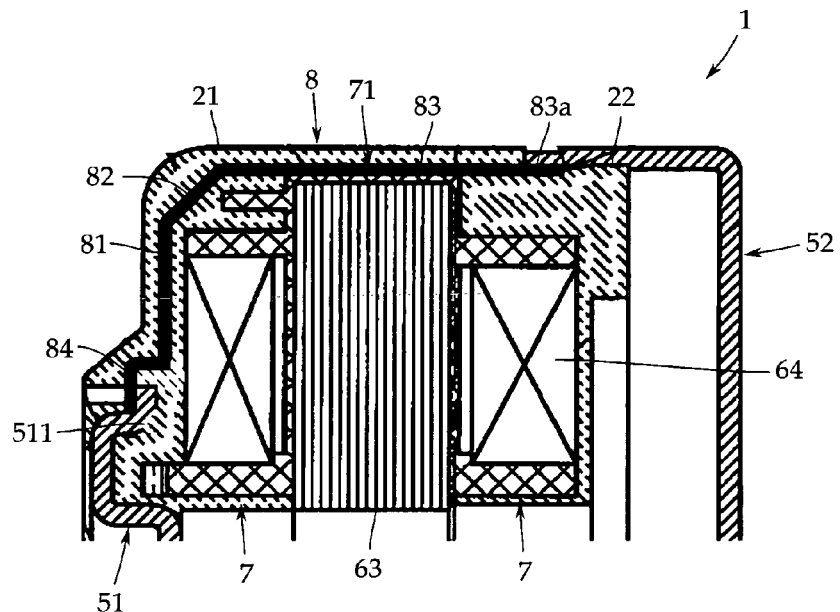
FIG. 2 is a partial enlarged sectional view enlargedly showing a portion around a conductive member of the molded motor shown in FIG. 1.
Figure 7:
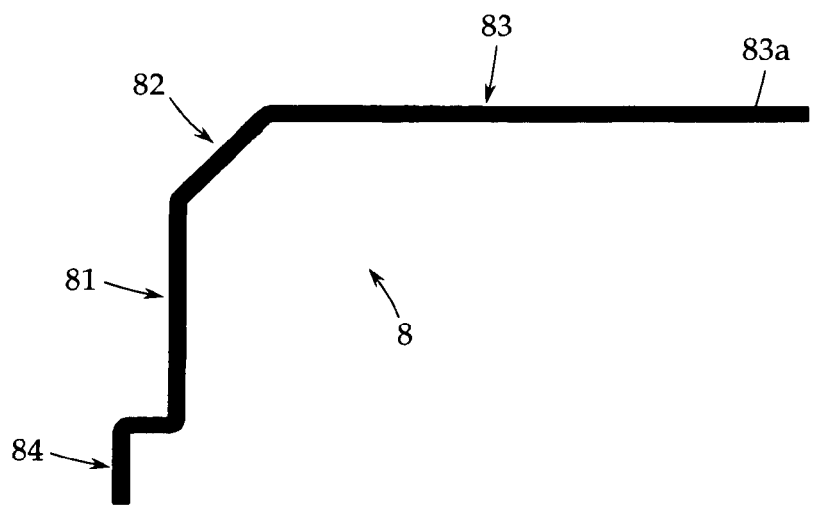
FIG. 7 is a side view of a conductive member.

As shown in FIGS. 2 and 7, the conductive member 8 consists of a molded product of a conductive metal sheet such as a stainless steel sheet. The conductive member 8 includes a first conductive part 81 arranged along one end surface (the left end surface in FIG. 2) in the axial direction of the stator core 6, a bent part 82 arranged along the corner portion of the stator core 6, and a second conductive part 83 arranged along the outer peripheral surface of the stator core 6 from the bent part 82. Since the steel sheet of the conductive member 8 is entirely covered with the molding resin part 21, the steel sheet does not rust or corrode, so that surface treatment such as rustproofing need not be performed. According to this configuration, the cost involved in surface treatment can be saved.

The first conductive part 81 is arranged with a predetermined gap being provided from the stator core 6 so as to be in non-contact with the stator core 6 and the coil 65. The tip end of the first conductive part 81 is further bent to a crank shape, and a first terminal part 84 connected to the first bracket 51 is provided.

Figure 8A:
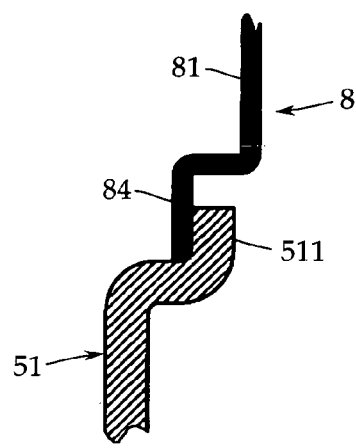
FIG. 8A is an enlarged view of a contact point part between a conductive member and a first bracket.

As shown in FIG. 8A, the first terminal part 84 is provided so as to be in contact with a flange part 511 formed at the outer periphery of the first bracket 51. According to this configuration, the first terminal part 84 and the first bracket 51 are coveredly hardened by the molding resin in a state of being in contact with each other, so that an electrical conduction can be established reliably.

Figure 8B:
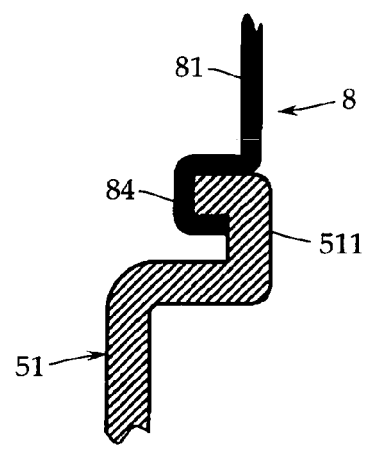
FIG. 8B is an enlarged view showing a modification of a contact point between a conductive member and a first bracket.

In this example, the first terminal part 84 is arranged along the flange part 511. However, in order to maintain the conductive state more reliably, as shown in FIG. 8B, the first terminal part 84 may be configured so that the tip end thereof is bent so as to hold the outer periphery of the flange part 511 bent at almost right angles.

The second conductive part 83 is arranged almost in parallel with the outer peripheral surface of the stator core 6 so as to be in non-contact with the stator core 6 due to the above-described holding member 71, and the whole thereof is embedded in the molding resin part 21.

On the outer peripheral surface on the other end surface side (the right end surface side in FIG. 2) in the axial direction of the stator 2, a bracket engagement surface 22 for fitting the second bracket 52 is provided. The bracket engagement surface 22 is a ring-shaped surface having an outside diameter one step smaller than the outside diameter of the molding resin part 21 of the stator 2, and is configured so that by fitting the inner peripheral surface of the second bracket 52 on the bracket engagement surface 22, the second bracket 52 is installed on the stator 2.

Figure 9A:
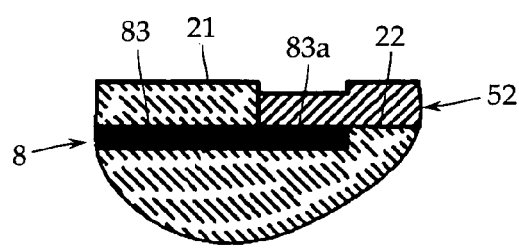
FIG. 9A is an enlarged view of a contact point part between a conductive member and a second bracket.

A second terminal part 83a that is a contact point between the conductive member 8 and the first bracket 52 is provided so as to be exposed from a part of the above-described bracket engagement surface 22. As shown in FIG. 9A, the second terminal part 83a is an exposed surface on which a part of the tip end of the second conductive part 83 is exposed to the bracket engagement surface 22, and is provided so as to be almost the same plane as the bracket engagement surface 22. Since the arrangement is such that a part of the second terminal part 83a is exposed to the bracket engagement surface 22 in this manner, by putting the second bracket 52 on the stator 2, the second bracket 52 and the conductive member 8 are electrically connected to each other.

Figure 9B:
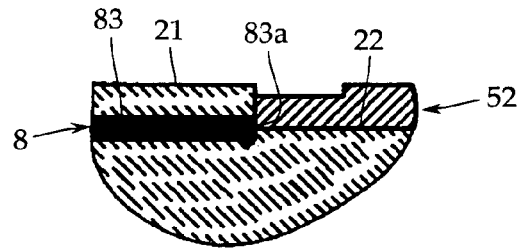
FIG. 9B is an enlarged view showing a modification of a contact point between a conductive member and a second bracket.

In this example, the second terminal part 83a is provided so as to be exposed to the same surface as the bracket engagement surface 22. However, as shown in FIG. 9B, the second terminal part 83a may be provided in a part of a level difference surface between the bracket engagement surface 22 and the outer peripheral surface of the stator 2.

In this example, a portion facing to the second terminal part 83a of the second bracket 52 is depressed to the second terminal part 83a side by staking after the second bracket 52 has been fitted on the bracket engagement surface 22. Thereby, the state in which the second bracket 52 and the conductive member 8 adhere more closely to each other is formed, which makes the electrical connection more reliable. Besides the mechanical working such as staking, an electrical conduction May be established, for example, by interposing a conductive tape between the second bracket 52 and the second terminal part 83a.

Since the above-described contact point between the first terminal part 84 and the flange part 511 is an interfacial contact, the contact point may come off due to the injection pressure of molding resin produced when the stator core 6 is molded by using the molding resin.

Figure 10:
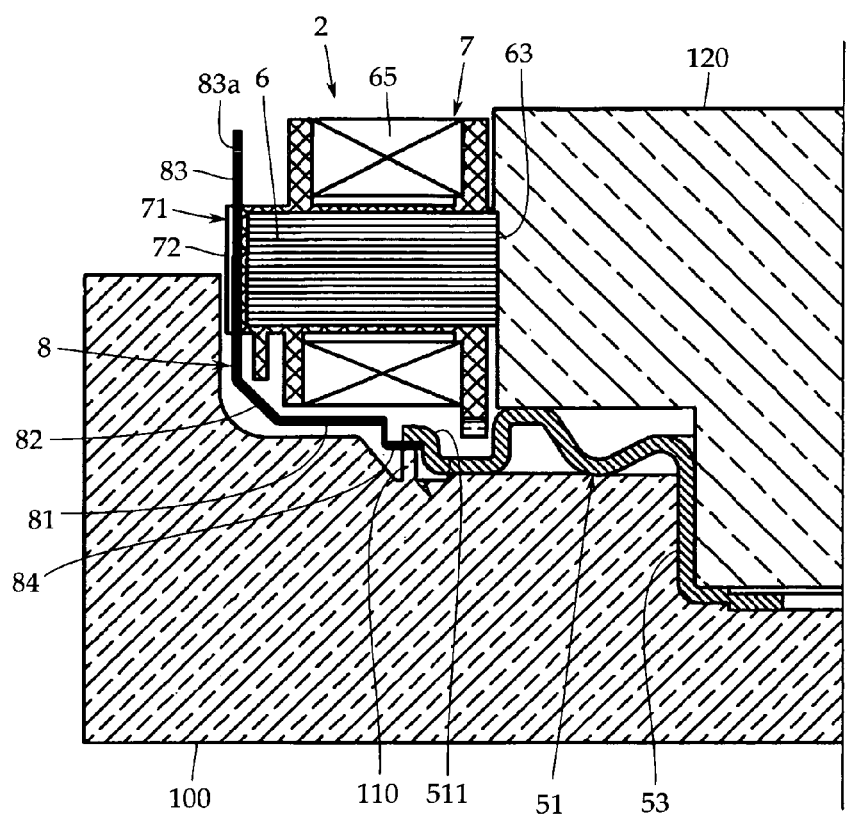
FIG. 10 is a sectional view of an essential portion in a state in which a stator core is arranged in a mold.

To solve this problem, as shown in FIG. 10, when the stator 2 is molded in a mold, a pressing part 110 for pressing a part of the conductive member 8 against the flange part 511 is provided on a mold (a lower mold 100) accommodating the stator core 6.

The pressing part 110 consists of a convex part provided so as to project from a bottom portion of the lower mold 100, and is arranged so as to face to the contact point between the flange part 511 of the first bracket 51 and the conductive member 8. According to this configuration, at the time of molding, the molding resin is poured in the state in which the first terminal part 84 of the conductive member 8 is pressed against the flange part 511 by the pressing part 110, so that the stator 2 can be molded while the conduction state between the flange part 511 and the conductive member 8 is maintained.

One example of a procedure for assembling the stator 2 is explained with reference to FIGS. 1 and 10. First, after the insulator 7 has been installed on the stator core 6 assembled in advance, the coil 65 is wound on the outer periphery of each of the teeth 62 by using a special-purpose winding machine.

Next, after the stator core 6 and the bracket 5 have been fitted to a core 120 in sequence, the conductive member 8 is installed. The tip end of the second terminal part 83 of the conductive member 8 is inserted from the opening side at one end (the lower end in FIG. 10) of the holding groove 72 of the holding member 71. The conductive member 8 is moved as it is, and is pushed until the first terminal part 84 comes into contact with the flange part 511. Thereby, the first terminal part 84 and the flange part 511 are brought into elastic contact with each other.

Next, the stator core 6 and the first bracket 51, provided with the conductive member 8, are inserted in the lower mold 100 together with the core 120. Then, an upper mold, not shown, is put from the upside to enclose the stator core 6. At this time, since the pressing part 110 provided in the lower mold 100 presses a part of the first terminal part 84 of the conductive member 8, the first terminal part 84 is forcedly pressed against the flange part 511.

Thereafter, the molten molding resin is poured into the mold by using an insert molding machine, not shown, whereby the outer periphery of the stator core 6 is covered by the molding resin part 21. Thereby, the whole part of the conductive member 8 is embedded in the molding resin part 21 with the second terminal part 83a being left. At this time, since the first terminal part 84 is being pressed against the flange part 511 by the pressing part 110, the molding resin is prevented from flowing in between the contact surfaces of the conductive member 8 and the first bracket 51 due to the injection pressure of the molding resin.

When the molding resin is cooled to some degree, the stator 2 covered with the molding resin part 21 is removed from the mold. The first bearing 41 is installed to the first bracket 51 of the stator 2 removed from the mold, the output shaft 31 of the rotor 3 is force fitted therein, and the rotor 3 is arranged coaxially in the center of the stator 2.

After a control board 130 has been installed on the other end surface of the stator 2, and the wiring between the control board 130 and the coil 65 has been performed, the second bracket 52 provided with the second bearing 42 in advance is force fitted from the other end of the output shaft 31 of the rotor 3.

The second bracket 52 is inserted along the bracket engagement surface 22 of the stator 2 until it hits the level difference surface of the stator 2. Thereby, the inner peripheral surface of the second bracket 52 is brought into contact with the second terminal part 83a, and the first bracket 51 and the second bracket 52 are electrically conducted via the conductive member 8.

Thereafter, an outer peripheral portion facing to the second terminal part 83a of the second bracket 52 is forcedly caused to adhere closely toward the inside diameter side by staking. Thereby, the second bracket 52 is fixed to the stator 2, and poor contact of the second bracket 52 with the second terminal part 83a is prevented. By a series of processes described above, the motor 1 is assembled.

In this embodiment, the motor 1 has been explained by taking an inner rotor motor as an example. However, the object of the present invention is to restrain electrolytic corrosion by establishing an electrical conduction between the brackets each provided with the bearing supporting mechanism for the rotor output shaft and providing equal potentials to the brackets. Therefore, if this object can be achieved, the present invention may be applied to, for example, an outer rotor motor or an axial gap motor.

The invention claimed is:

1. A molded motor, comprising:
   a stator in which a stator core is integrally molded by a molding resin and is covered with a molding resin part;
   a rotor arranged on an inner peripheral surface side of the stator and an output shaft attached to the rotor;
   a pair of metallic brackets arranged on both end surface sides in an axial direction of the stator; and
   a pair of bearings attached to the output shaft,
   each of the brackets being provided with a bearing supporting part for supporting the bearing, wherein
   the pair of brackets comprises a first bracket for holding one of the bearings and a second bracket for holding the other of the bearings,
   a conductive member which is electrically in non-contact with the stator core and is electrically connected to the first bracket and the second bracket is embedded and entirely covered within the molding resin part,
   the stator core is provided with an insulator,
   the insulator is provided with a holding member for holding the conductive member, and
   the holding member forms a holding groove in which the conductive member fits.

2. The molded motor according to claim 1, wherein
   the conductive member comprises an L-shaped metal sheet arranged along an outer peripheral surface from one end surface in an axial direction of the stator core, and
   the first bracket is molded integrally by the molding resin in a state of being electrically connected to one end of the conductive member.

3. The molded motor according to claim 2, wherein the other end of the conductive member is exposed from a part of an outer peripheral surface of the stator, and is fixed so that the second bracket is in contact with an exposed surface of the other end of the conductive member.

4. The molded motor according to claim 1 wherein
   the holding member is provided on an outer peripheral surface of the stator core along an axis line direction of the output shaft, and
   the holding member is provided with a holding groove for holding the conductive member.

5. The mold motor according to claim 1, wherein the holding member forms the holding groove in a part formed into a C shape in a cross section of the holding member.

6. The mold motor according to claim 1, wherein the holding member forms the holding groove in a part formed into an L shape in a cross section of the holding member.

7. The mold motor according to claim 1, wherein
   the first bracket has a flange part at an end part thereof, and
   the second bracket has a bracket engagement surface at an end part thereof.

8. The mold motor according to claim 7, wherein the flange part engages with a first terminal part formed at an end part of the conductive member.

9. The mold motor according to claim 8, wherein
a second terminal part is formed at other end part of the conductive member, and
the second terminal part is exposed to the bracket engagement surface.

10. The mold motor according to claim 8, wherein the first terminal member and the flange part are bent to hook up the first terminal member and the flange part with each other.

11. The mold motor according to claim 1, wherein the conductive member has a bent part present along a corner portion of the stator core.

12. A molded motor, comprising:
a stator in which a stator core is integrally molded by a molding resin and is covered with a molding resin part;
a rotor arranged on an inner peripheral surface side of the stator and an output shaft attached to the rotor;
a pair of metallic brackets arranged on both end surface sides in an axial direction of the stator; and
a pair of bearings attached to the output shaft,
each of the brackets being provided with a bearing supporting part for supporting the bearing,
wherein the pair of brackets comprises a first bracket for holding one of the bearings and a second bracket for holding the other of the bearings,
a conductive member which is electrically in non-contact with the stator core and is electrically connected to the first bracket and the second bracket is embedded and entirely covered within the molding resin part,
on an outer peripheral surface of the stator core, a concave part extends along an axis line direction of the output shaft,
the stator core includes a plurality of stator cores, and an insulator covering the stator cores for separating the same, the insulator having the concave part extending inwardly from an outer peripheral surface of the insulator, and
the conductive member is arranged and disposed in the concave part.

13. The mold motor according to claim 12, wherein the molding resin part is provided on an outer surface of the insulator so that the conductive member disposed in the concave part is covered by the molding resin part.

* * * * *